US008935743B2

(12) United States Patent
Sarferaz

(10) Patent No.: US 8,935,743 B2
(45) Date of Patent: Jan. 13, 2015

(54) WEB SERVICE SECURITY COCKPIT

(75) Inventor: Siar Sarferaz, Speyer (DE)

(73) Assignee: SAP SE, Walldorf (DE)

( * ) Notice: Subject to any disclaimer, the term of this patent is extended or adjusted under 35 U.S.C. 154(b) by 245 days.

(21) Appl. No.: 13/015,296

(22) Filed: Jan. 27, 2011

(65) Prior Publication Data

US 2012/0198511 A1 Aug. 2, 2012

(51) Int. Cl.
H04L 29/06 (2006.01)
G06F 15/177 (2006.01)
G06F 21/00 (2013.01)
G06F 3/048 (2013.01)

(52) U.S. Cl.
CPC ............... H04L 63/20 (2013.01); G06F 21/00 (2013.01); G06F 15/177 (2013.01); H04L 63/02633 (2013.01); H04L 63/14 (2013.01); G06F 3/048 (2013.01)
USPC ................ 726/1; 715/736; 717/120; 717/121

(58) Field of Classification Search
CPC ..... H04L 63/0263; H04L 63/14; H04L 63/20; G06F 21/00; G06F 3/048; G06F 15/177
USPC .......................................................... 726/1
See application file for complete search history.

(56) References Cited

U.S. PATENT DOCUMENTS

| 7,757,268 | B2 * | 7/2010 | Gupta et al. | 726/1 |
|---|---|---|---|---|
| 7,761,794 | B1 * | 7/2010 | Chari et al. | 715/700 |
| 7,934,248 | B1 * | 4/2011 | Yehuda et al. | 726/1 |
| 7,962,470 | B2 * | 6/2011 | Degenkolb et al. | 707/709 |
| 2002/0078382 | A1 * | 6/2002 | Sheikh et al. | 713/201 |
| 2005/0268326 | A1 * | 12/2005 | Bhargavan et al. | 726/1 |
| 2006/0282494 | A1 | 12/2006 | Sima et al. | |
| 2009/0089109 | A1 * | 4/2009 | Rabetge et al. | 705/7 |
| 2009/0205011 | A1 * | 8/2009 | Jain et al. | 726/1 |
| 2010/0251329 | A1 * | 9/2010 | Wei | 726/1 |
| 2011/0161848 | A1 * | 6/2011 | Purcell et al. | 715/764 |

FOREIGN PATENT DOCUMENTS

WO 2004/111785 12/2004

OTHER PUBLICATIONS

Extended European Search Report issued in European Application No. 12152445.8 on Jul. 9, 2012; 5 pages.

* cited by examiner

Primary Examiner — Tae Kim
Assistant Examiner — Louis Teng
(74) Attorney, Agent, or Firm — Fish & Richardson P.C.

(57) ABSTRACT

A first configuration object identifies attributes of a configuration of a first web service. Security setting data is identified defining a security setting rules for the computing system. The failure of the first attribute to satisfy at least one security setting rule is determined. A second configuration object is identified that identifies attributes of a configuration of a second web service. The failure of the second attribute to satisfy at least one security setting rule is determined. A service security cockpit is presented identifying that configurations of at least the first and second web services are unsecure, based at least in part on the determination that the first and second attributes fail to satisfy security setting rules. User input is received, through the cockpit, identifying a resolution action directed to resolve the first attribute failing to satisfy at least one security setting rule. The identified resolution action is then initiated.

18 Claims, 4 Drawing Sheets

WEB SERVICE SECURITY COCKPIT

TECHNICAL FIELD

This present disclosure relates to service-oriented software systems, and more particularly to managing security policies of computing systems involved in a service-oriented software environment.

BACKGROUND

Web services can include software systems designed to support machine-to-machine interaction over a network, allowing for software programs, applications, operations, and modules, or services, executed and served at least in part by a remote computing device, to be accessed and consumed by another computing device or system. A number of web service platforms, specifications, interfaces, architectures, and messaging protocols have been developed and popularized, including web services description language (WSDL), service oriented architecture (SOA), Simple Object Access Protocol (SOAP), Representational State Transfer (REST), and Universal Description, Discovery, and Integration (UDDI), among others.

Systems consuming a web service can interact with the third party systems serving the web service. In some instances, servers of the web service can also interact with systems consuming the web service. Consequently, both web service servers and consumers can open their respective systems to access and at least partial control by one or more other systems during and in connection with the delivery of a particular web service. Exposing one's system to another in the delivery of a web service can introduce security vulnerabilities to both server and consumer systems. Consequently, each system in a web service transaction or relationship can set security settings, rules, measures, and protocols to assist in protecting their respective system from security threats introduced as side effects of the system's participation in the consumption or delivery of a particular web service.

SUMMARY

This disclosure provides various embodiments for monitoring security of a plurality of web services configurations of a computing system. A first configuration object can be identified in memory from a plurality of configuration objects, each configuration object in the plurality of configuration objects identifying a plurality of attributes of a configuration of a particular web service consumed by a computing system. The first configuration object can identify a set of attributes of a configuration of a first web service to be consumed by a particular computing system. Security setting data can be identified for the first computing system defining a plurality of security setting rules for the particular computing system. At least one processing device can be used to determine that at least one first attribute in the set of attributes of the configuration of the first web service fails to satisfy at least one security setting rule in the plurality of security setting rules. A second configuration object can be identified in memory from the plurality of configuration objects, the second configuration object identifying a set of attributes of a configuration of a second web service to be consumed by the particular computing system. At least one processor can be used to determine that at least one second attribute in the second set of attributes of the configuration of the second web service fails to satisfy at least one security setting rule in the plurality of security setting rules. Data can be sent that is configured to present, on a user interface of a computing device, a service security cockpit identifying that configurations of at least the first and second web services are unsecure, based at least in part on the determination that the first and second attributes fail to satisfy security setting rules. User input can be received identifying a resolution action directed to resolve the first attribute failing to satisfy at least one security setting rule. The user input can be entered through the service security cockpit. The identified resolution action can then be initiated.

While generally described as computer implemented software that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

Like reference symbols in the various drawings indicate like elements.

DETAILED DESCRIPTION

Figure 1:
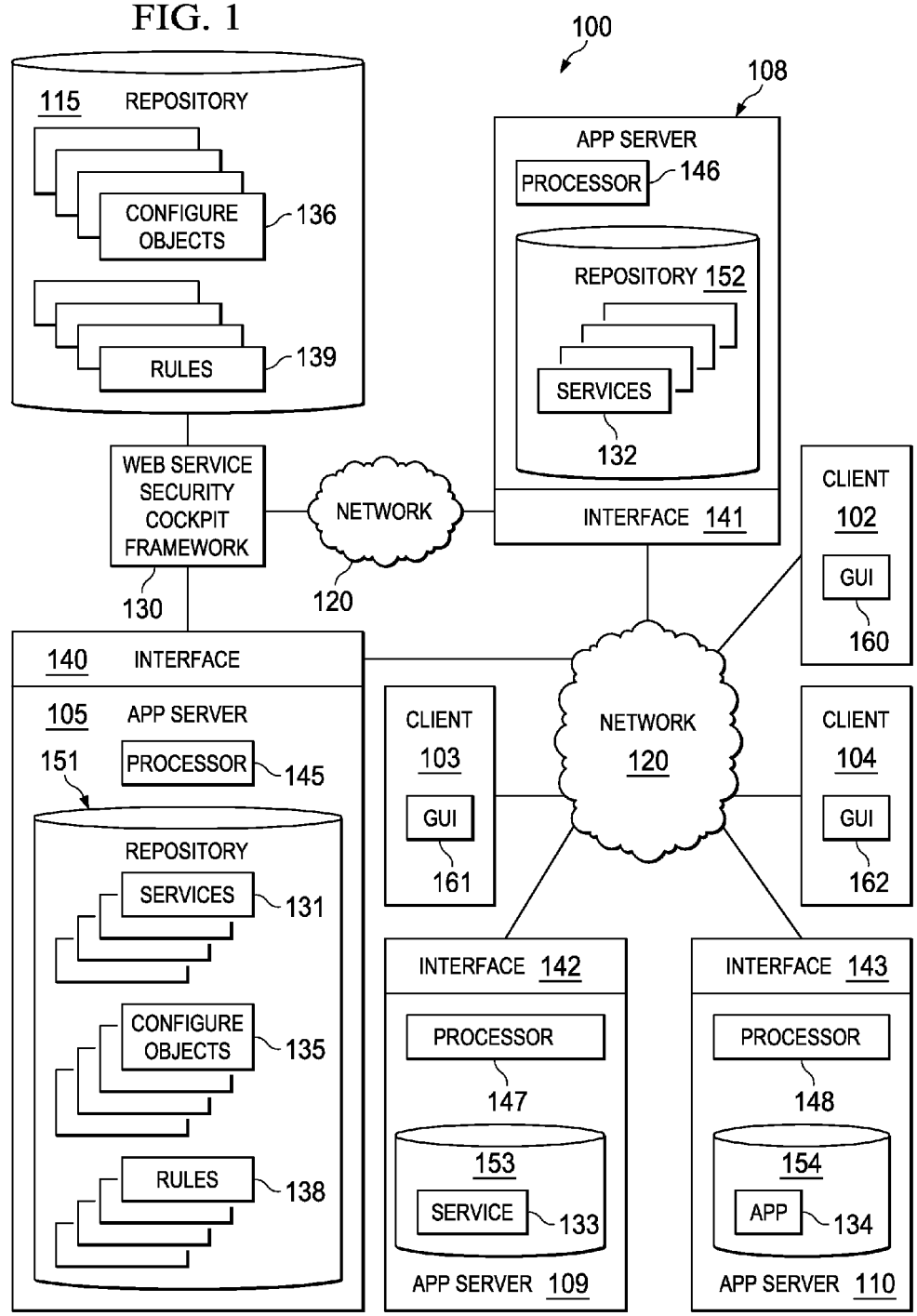
FIG. 1 illustrates an example system including a web service security cockpit.

Service-based software environments, including web-based environments, include a server system serving a software service to one or more client consumers. In some modern systems, such as an enterprise software system, services can be served to hundreds of different consumers with different requirements and security policies. Indeed, some client-consumers make use of, or consume, multiple software services from, potentially, multiple servers, or vendors. Further complicating the many and varied relationships with a service-based software environment, are parties that both consume services, as well as serve services from and to other remote computing systems. Indeed, some services served by a software service server make use of other web services consumed by the server. Accordingly, software service consumers and servers can manage dozens to hundreds of different relationships and software services connected to their businesses. While these arrangements present challenges to business units responsible for managing these sometimes complex relationships, the challenges facing IT personnel can be even more daunting. In some web services, an application server opens its backend computing systems to service consumers, exposing the server's systems to outside security threats and other vulnerabilities. Additionally, service consumers can also expose their systems through the consumption of web services. Accordingly, detailed security profiles and settings can be maintained by both service servers and consumers in connection with a particular service. Security settings can be based on security policies of the individual server or consumer. Security needs and settings can also vary based on the particular service. Accordingly, in some instances, a particular entity serving and consuming a plurality of different services to and from a plurality of different third parties may need to maintain hundred and thousands of varying security settings across these many relationships.

Given this complexity, often IT personnel tasked with maintaining system security apply a default, or one-size-fits-all security model to each or a group of the services it consumes or serves, given the prohibitive complexity of managing and tuning security policies to each individual service, consumer, or vendor. Among other advantages, a web service security cockpit can be used to automate and assist tasks connected with managing web service security for a particular entity or computing system. For instance, a web service security cockpit can identify instances of unsecure configurations of a particular web service to be served or consumed by the system and present a summary of these identified unsecure configurations for a plurality of different services. Additionally, tasks associated with remedying identified unsecure service configurations can also be launched, tracked, and otherwise managed from the web service security cockpit. Further, reporting, analytics, and other statistical analyses can be driven from the web service security cockpit to assist IT personnel in monitoring and reporting system-wide trends and issues relating to the entity's web service security efforts.

Turning to the example implementation of FIG. 1, the illustrated software environment 100 includes, or is communicably coupled with, one or more clients 102, 103, 104, one or more application servers (e.g., 105, 108, 109, 110), such as application servers within an enterprise software environment, a web service security cockpit framework 130, and one or more data repositories (e.g., 115), using one or more networks 120. Each of the servers 105, 108, 109, 110, as well as computing devices implementing web service security cockpit framework 130, comprise electronic computing devices operable to receive, transmit, process, store, or manage data and information associated with the software environment 100. As used in this document, the term "computer" is intended to encompass any suitable processing device. For example, the environment 100 may be implemented using computers other than servers, including a server pool. Further, any, all, or some of the servers 105, 108, 109, 110 may be adapted to execute any operating system, including Linux, UNIX, Windows Server, or any other suitable operating system.

In the example embodiment illustrated in FIG. 1, the web service security cockpit framework 130 can be implemented using one or more computing devices to provide a platform for monitoring whether and to what degree a plurality web service configurations conform to a set of security settings or rules set for or consuming the service. The web service security cockpit framework 130 can be integrated with the computing system (e.g., 105) serving or consuming the service monitored, or can be itself delivered as a reusable service to a plurality of remote computing systems (e.g., 108, 109, 110) to monitor the security of web service configurations on the remote systems. In connection with identifying unsecure configurations of a web service, the web service security cockpit framework 130 can access and consult data stored in configuration objects 135, 136 each describing a particular configuration of a web service. Configuration data maintained in configuration objects 135, 136 can be compared against security setting rules and other rules 138, 139 to determine if a given configuration is unsecure. Configuration objects 135, 136 and rule data 138, 139 can be maintained in memory (e.g., 151) associated with the systems serving or consuming the service or in data repositories (e.g., 115) associated with the web service security cockpit framework 130.

Services can be consumed using client computing devices 102, 103, 104 including graphical user interfaces (GUIs) (e.g., 160, 161, 162), allowing human users to interface and interact with user interfaces of the services. Additionally, a graphical presentation and interactive user interface of the web service security cockpit can be accessed and displayed through GUIs 160, 161, 162 of client computing devices used to access and use the web security cockpit. Users of the web service security cockpit can be IT personnel or other users responsible for maintaining web service security for a system. In some instances, given the sensitivity of systems' security, users of the web service security cockpit can be required to be authenticated to ensure that only authorized users access the security cockpit. Further, in instances where the web service security cockpit is a reusable service, authenticating a user can be used to automatically identify the particular entity or system (i.e., web service security cockpit framework consumer) for which the web service security cockpit service is to be provided.

Computing devices implementing the web service security cockpit framework 130 can each include one or more processors executing software comprising the web service security cockpit framework 130, including single or multiple processors, including multiple processors operating in a network or pool of computing devices, including parallel processing and cloud computing environments. Each processor can execute instructions and manipulate data to perform operations and implement the functionality of the web service security cockpit framework 130 as well as access, manipulate, and manage data used in and generated by the web service security cockpit framework 130. For instance, web service security cockpit framework 130 can access and use configuration objects 135, 136 and rules data 138, 139 used to identify security vulnerabilities or violations and control what types of unsecure configurations presented in the security cockpit and how they are presented.

Application servers 105, 108, 109, 110 (and, in some instances, web service security cockpit framework 130) can each include at least one interface (140, 141, 142, 143), one or more processors (145, 146, 147, 148), and computer-readable memory (151, 152, 153, 154). Application servers can be configured to serve web services (e.g., 131, 132, 133), such as SOA-based, SAP iDoc-based, or RFC-based web services, for example. In some instances, some combination of application servers 105, 108, 109, 110 (and, in some instances, web service security cockpit framework 130, and repositories 115) can be hosted on a common computing system, server, or server pool, and share computing resources, including shared memory, processors, and interfaces. The interfaces 140, 141, 142, 143 can be used for communicating with other systems in a client-server or other distributed environment (including within environment 100) connected to the network 120, for example the one or more clients 102, 103, 104, external data sources (e.g., 115), or any other computing device adapted to interface with the servers 105, 108, 109, 110, including devices not illustrated in FIG. 1. Generally, each interface 140, 141, 142, 143 comprises logic encoded in software and/or hardware in a suitable combination and operable to communicate with the network 120. More specifically, the interfaces 140, 141, 142, 143 may comprise software supporting one or more communication protocols associated with communications such that the network 120 or hardware is operable to communicate physical signals within and outside of the illustrated software environment 100.

Each processor 145, 146, 147, 148 can execute instructions and manipulate data to perform the operations of an associated server or system (e.g., 105, 108, 109, 110) and may comprise, for example, a central processing unit (CPU), a blade, an application specific integrated circuit (ASIC), or a field-programmable gate array (FPGA), among other suitable options. Although each processor 145, 146, 147, 148 is illustrated as a single processor, multiple processors may be used according to the particular needs of the associated server. References to a single processor 145, 146, 147, 148 are meant to include multiple processors where applicable. The operations that each processor 145, 146, 147, 148 executes are determined by the purpose and operations of its associated server. Generally, the processor 145, 146, 147, 148 executes instructions and manipulates data to perform the operations of its respective server and, specifically, the software systems, services, and applications hosted by the servers 105, 108, 109, 110.

At a high level, each "server" (e.g., 105, 108, 109, 110) includes one or more electronic computing devices operable to receive, transmit, process, store, or manage data and information associated with the environment 100. Specifically, a server is responsible for receiving requests from one or more clients and sending the appropriate response to the requesting client. In addition to requests from external clients, requests may also be sent from internal users, external or third-party customers, other automated applications, as well as any other appropriate entities, individuals, systems, or computers. For example, although FIG. 1 illustrates each server as a single server, a server can be implemented using two or more servers, as well as computers other than servers, including a server pool. Indeed, a server may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, servers may be adapted to execute any operating system, including Linux, UNIX, Windows, Mac OS, or any other suitable operating system.

In the case of servers hosting, serving, or otherwise providing software services or products, a processor (e.g., 145, 146, 147, 148) can execute the functionality required to receive and respond to requests from clients, as well as client applications interfacing with the server's hosted application (e.g., 130, 131, 132, 133, 134). It will be understood that the term "application server" (e.g., 105, 108, 109, 110) can include any suitable software component or module, or computing device(s) capable of hosting and/or serving a software application, including distributed, enterprise, or cloud-based software applications. Regardless of the particular implementation, "software" may include computer-readable instructions, firmware, wired or programmed hardware, or any combination thereof on a tangible medium operable when executed to perform at least the processes and operations described herein. Indeed, each software component may be fully or partially written or described in any appropriate computer language including C, C++, Java, Visual Basic, assembler, Perl, any suitable version of 4GL, as well as others. Applications can be implemented as individual modules that implement the various features and functionality through various objects, methods, or other processes, or may instead include a number of sub-modules, third party services, components, libraries, and such, as appropriate. Conversely, the features and functionality of various components can be combined into single components as appropriate.

At a high level, each of the one or more hosted applications and services (e.g., 116, 117, 118) illustrated in the environment 100 can include any application, program, module, process, or other software that may execute, change, delete, generate, or otherwise manage information according to the present disclosure, particularly in response to and in connection with one or more requests received from the illustrated clients 102, 103, 104, as well as other applications. In certain cases, only one hosted application may be located at a particular server. In others, a plurality of related and/or unrelated hosted applications may be stored at a single server, or located across a plurality of other servers, as well. In certain cases, environment 100 may implement a composite hosted application. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. Additionally, applications may represent web-based applications accessed and executed via the network 120 (e.g., through the Internet). Further, one or more processes associated with a particular hosted application or service may be stored, referenced, or executed remotely. For example, a portion of a particular hosted application or service may be a web service associated with the application that is remotely called, while another portion of the hosted application may be an interface object or agent bundled for processing at a remote client (e.g., 102, 103, 104). Moreover, any or all of the hosted applications and software service may be a child or sub-module of another software module or enterprise application (not illustrated) without departing from the scope of this disclosure. Still further, portions of a hosted application can be executed by a user working directly at a server hosting the application, as well as remotely at a client.

Each of the example servers 105, 108, 109, 110 can also include a memory (115, 151, 152, 153, 154 respectively). Further repositories 115 and computing devices (e.g., 102, 103, 104, 130) can also each include at least one memory device. Each memory may include any memory or database module and may take the form of volatile or non-volatile memory including, without limitation, non-transitory memory elements, magnetic media, optical media, random access memory (RAM), read-only memory (ROM), removable media, or any other suitable local or remote memory component. Each memory may store various objects or data, including classes, frameworks, applications, backup data, business objects, jobs, web pages, web page templates, database tables, content repositories storing business or other dynamic information, or other information including any parameters, variables, algorithms, instructions, rules, constraints, or references thereto relevant to the purposes of the particular server. Each memory may also include any other appropriate data, such as VPN applications, firmware logs and policies, firewall policies, a security or access log, print or other reporting files, as well as others. Again, the particular data and instructions stored in each memory (e.g., 131, 132, 133, 134, 135, 136, 138, 139) will be described in detail below in connection with the illustrated implementations of the software environment 100 and components thereof.

Generally, the network 120 facilitates wireless or wireline communications between the components of the software environment 100 (e.g., between the application servers 105, 108, 109, 110, web service security cockpit framework 130, and one or more clients (e.g., 102, 103, 104), as well as between other components as appropriate), as well as with any other local or remote computer, such as those associated with one or more applications or external data sources. The network 120 can be implemented as one or more distinct networks. In any implementation, the network 120 may be a continuous or discontinuous network without departing from the scope of this disclosure, so long as at least a portion of the network 120 may facilitate communications between senders and recipients. The network 120 may be all or a portion of an enterprise or secured network. As an example, in FIG. 1 networks 120 may represent a portion of an enterprise network, or a connection to the Internet. In some instances, a portion of the network 120 may be a virtual private network (VPN). All or a portion of the network 120 can comprise either a wireline or wireless link. Example wireless links may include 802.11a/b/g/n, 802.20, WiMax, and/or any other appropriate wireless link. In other words, the network 120 encompasses any internal or external network, networks, sub-network, or combination thereof operable to facilitate communications between various computing components inside and outside the illustrated environment 100. The network 120 may communicate, for example, Internet Protocol (IP) packets, Frame Relay frames, Asynchronous Transfer Mode (ATM) cells, voice, video, data, and other suitable information between network addresses. The network 120 may also include one or more local area networks (LANs), radio access networks (RANs), metropolitan area networks (MANs), wide area networks (WANs), all or a portion of the Internet, and/or any other communication system or systems at one or more locations.

The illustrated implementation of FIG. 1 includes one or more local and/or remote clients 102, 103, 104. A client 102, 103, 104 can be any computing device operable to connect or communicate at least with an application server 105, 108, 109, 110, the web service security cockpit framework 130, and/or the network 120 using a wireline or wireless connection. Each client 102, 103, 104 includes at least one GUI (e.g., 160, 161, 162). In general, the client 102, 103, 104 comprises an electronic computing device operable to receive, transmit, process, and store any appropriate data associated with the software environment of FIG. 1. It will be understood that there may be any number of clients 102, 103, 104 associated with environment 100, as well as any number of clients 102, 103, 104 external to environment 100. Further, the term "client" and "user" may be used interchangeably as appropriate without departing from the scope of this disclosure. Moreover, while each client 102, 103, 104 is described in terms of being used by one user, this disclosure contemplates that many users may use one computer or that one user may use multiple computers. As used in this disclosure, the client 102, 103, 104 is intended to encompass a personal computer, electronic notepad, touch screen terminal, workstation, network computer, kiosk, wireless data port, smart phone, personal data assistant (PDA), one or more processors within these or other devices, or any other suitable processing device. For example, the client 102, 103, 104 may comprise a computer that includes an input device, such as a keypad, touch screen, mouse, or other device that can accept information, and an output device that conveys information associated with operations of one or more applications stored and/or executed on an application server (or other servers in environment 100) or on the client 102, 103, 104 itself, including digital data, visual information, or GUI 160, 161, 162. Both the input device and the output device may include fixed or removable storage media such as a magnetic computer disk, CD-ROM, or other suitable media to both receive input from and provide output to users of the clients 102, 103, 104 through the display, namely the GUI 160, 161, 162.

The GUI 160, 161, 162 comprises a graphical user interface operable to allow the user to interface with at least a portion of environment 100 for any suitable purpose, including allowing a user to interact with one or more software applications including web service security cockpit framework 130 and applications and services (e.g., 131, 132, 133, 134) served by application servers 106, 108, 109, 110. Generally, the GUI 160, 161, 162 provides users with an efficient and user-friendly presentation of data provided by or communicated within the system, such as an interactive analytics presentation provided through web service security cockpit framework 130. The term "graphical user interface," or GUI, may be used in the singular or in the plural to describe one or more graphical user interfaces and each of the displays of a particular graphical user interface. Therefore, the GUI 160, 161, 162 can be any graphical user interface, such as a web browser, touch screen, or command line interface (CLI) that processes information in the environment 100 and efficiently presents the results to the user. In general, the GUI 160, 161, 162 may include a plurality of user interface (UI) elements such as interactive fields, pull-down lists, media players, tables, graphics, virtual machine interfaces, buttons, etc. operable by the user at the client. These UI elements may be related to the functions of one or more applications or services (e.g., 130, 131, 132, 133, 134), including applications hosted locally at the client.

While FIG. 1 is described as containing or being associated with a plurality of elements, not all elements illustrated within environment 100 of FIG. 1 may be utilized in each alternative implementation of the present disclosure. Additionally, one or more of the elements described herein may be located external to environment 100, while in other instances, certain elements may be included within or as a portion of one or more of the other described elements, as well as other elements not described in the illustrated implementation. For instance, web service security cockpit framework 130 can be integrated with one or more of an enterprise software system, applications and services 131, 132, 133, 134, and other software and systems. Further, certain elements illustrated in FIG. 1 may be combined with other components, as well as used for alternative or additional purposes in addition to those purposes described herein.

Figure 2:
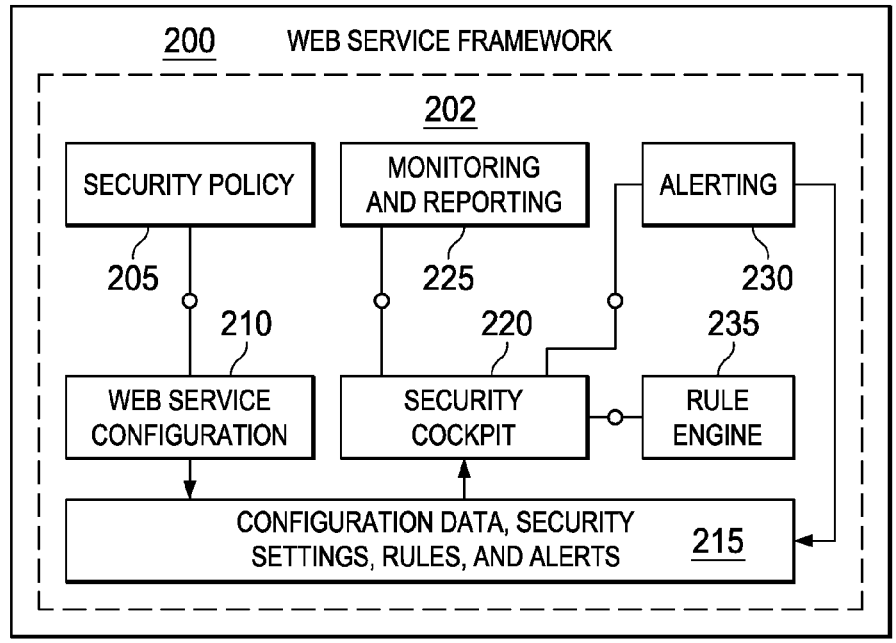
FIG. 2 is a schematic representation of an example web service utilizing a web service security cockpit.

FIG. 2 shows an example of one web service implementation including an integrated web service security cockpit. An example web service framework 200 can include modules and components 202 for use in connection with a web service security cockpit, in addition to runtime, design time, archiving, routing, and other modules and functionality used in typical web service frameworks. A security policy 205 can define the security settings, rules, thresholds, safeguards, initiative, protocols, and other features relating to the security of a particular computing system. A web service configuration 210 can define the particular configurations and settings of the web service and/or the computing system and devices implementing (i.e., serving or consuming). System security policy 205 can be embodied, stored, or contained in data, or data repositories, 215, the data 215 including data structures and objects, defining attributes of the system's security policy, including particular security setting rules and rules pertaining to the importance of certain security attributes (e.g., whether they require immediate attention (i.e., alerts). The data 215 can also include configuration objects defining attributes of the web service configuration. The data 215 can be used by the web service security cockpit 220 to perform security assessments to determine web service configuration attributes that violate or fall below standards defined in data describing the system's security policy and rules.

Among the functionality delivered using the web service security cockpit 220 are monitoring and reporting 225 of security status, alerting 230, and a rule engine 235. The monitoring and reporting module 225 can support the generation of statistical reporting and analysis of web service configuration security across each service consumed or served using the particular computing system, as well as the generation of analytics presentations for use by IT security personnel in making decisions relating to actions to be taken in response to identified unsecure service configurations. Reporting, monitoring, and analytics functionality can be based on security assessments performed by the web service security cockpit 220, including determinations that web service configurations, represented by configuration data (in 215), fail to satisfy an entity's system security policy. The monitoring and reporting module 225 can further be used to accept user inputs identifying whether certain security settings (and violations) can be accepted/ignored or targeted for resolution. Additionally, an alerting module 230 can be used to generate various alerts according to alerting rules. For instance, some aspects of a web service configuration and certain security setting rules can be identified as more critical or important to the security and functioning of the web service. Accordingly, aspects of a web service or security setting rules determined to be particularly sensitive or important can be flagged to trigger generation of an alert by the alerting module 230 in response to the identification of an unsecure configuration involving a particular security setting rule. Further, users can identify security settings and configuration data that have been incorrectly or inadequately defined or configured using the web service security cockpit 220 and redefine the security rules or web service configuration attributes using rule engine 235 to remedy some unsecure configurations. Indeed, in some examples, a user can choose to ignore an identification that an attribute of a configuration is unsecure and propagate an instruction to ignore similar unsecure configurations (e.g., using monitoring and reporting module 225). Rule engine 235 can be further used, during design time, to define rules for the security assessment (e.g., rules defining that only secure HTTP communication protocol is allowed, certificate-based and/or single-sign-on based authentication is allowed or required, message-based asymmetric encryption is allowed, etc.). Further, rule engine 235 can also be used to define alert rules for consideration by alerting module 230.

Figure 3:
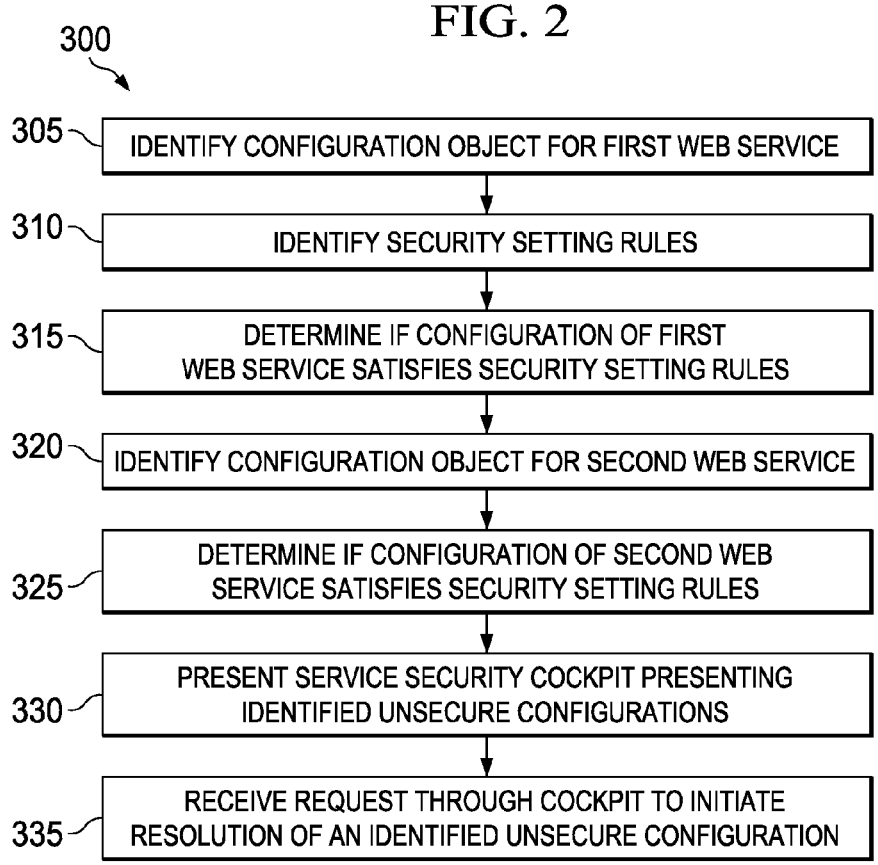
FIG. 3 is a flowchart of an example technique for monitoring security of a plurality of web services configurations of a computing system.

Turning now to the flowchart 300 of FIG. 3, an example technique 300 is shown for monitoring security of a plurality of web services configurations of a computing system, for example, using a web service security cockpit. A configuration object for a first web service is identified 305, identifying a plurality of attributes of a configuration of the first web service on a particular computing system, such as a SOA web service. The configuration object can be identified 305 from a plurality of other configuration objects, each including data identifying the respective attributes of a web service configuration. Security setting data can be identified 310 defining a plurality of security setting rules for the particular computing system. Using the first configuration object and security setting data, at least one processing device can determine 315 if configuration of the first web service satisfies the security setting rules of the system. For instance, it can be determined that at least one first attribute in the set of attributes of the configuration of the first web service, as defined in the first configuration object, fails to satisfy at least one security setting rule in the plurality of security setting rules. A configuration of a second web service can also be identified 320, the second configuration object identifying a set of attributes of a configuration of a second web service on the particular computing system, such as another SOA web service. At least one processing device can further determine 325 that at least one second attribute in the second set of attributes of the configuration of the second web service fails to satisfy at least one security setting rule in the plurality of security setting rules. Upon determining 315, 325 that the first and second web services fail to satisfy the security setting rules of the system, data can be sent to present 330 a web service security cockpit on a user interface of a client computing device, identifying the unsecure configurations of the first and second web services. A user request can be received 335, via the web services security cockpit to initiate resolution of an identified unsecure configuration.

In some examples, resolution of an identified unsecure web service configuration can include a request to ignore that a particular configuration attribute has been determined to be unsecure, failing to satisfy at least one security setting rule. Ignoring, or approving, an identified unsecure configuration can result in the generation of a record documenting that a particular IT personnel member approved an unsecure configuration. This can be useful in avoiding interdepartmental confusion and inconsistency in dealing with the unsecure configuration, as well as dealing with similar unsecure configurations in the future. For example, if another configuration attribute has been determined to be unsecure on similar bases as an earlier, accepted unsecure configuration, a user can be notified that the first unsecure configuration was approved and be provided with information to assist in determining whether the new unsecure configuration should also be ignored, such as metadata, user notes, identification of the approving IT personnel member, etc. Alternatively, a user can reject the unsecure configuration and initiate resolution and correction of the identified unsecure attribute.

Figure 4:
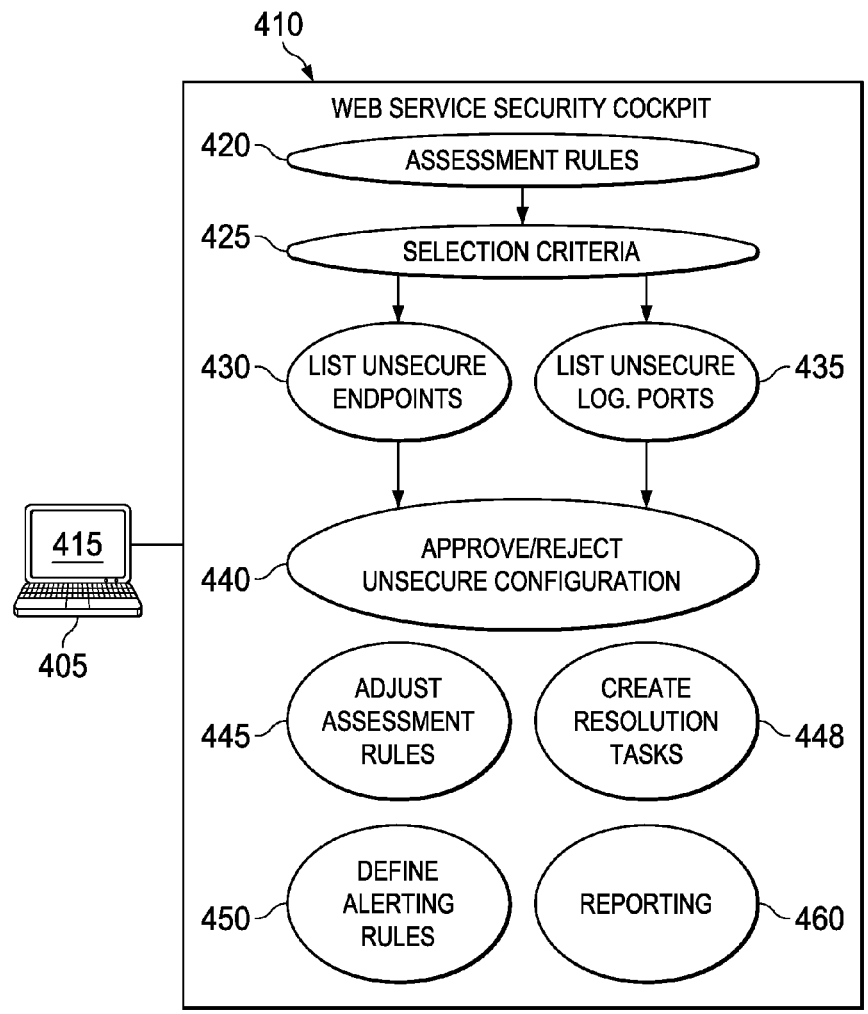
FIG. 4 is a schematic representation of a user's interaction with a web service security cockpit.

FIG. 4 illustrates a schematic representation of a user's interaction with a web service security cockpit. A user can interact with the web service security cockpit 410 via a client computing device 405 including a GUI 415. The web service security cockpit presented on GUI 415 can allow the user to quickly assess unsecure configurations in a plurality of web service either to be consumed or served by a system affiliated with the user. Assessment rules 420 can be used by the web service security cockpit 410 to define how the web service security cockpit 410 determines whether particular web service configuration attributes satisfy particular security setting rules. Indeed, in some instances, the assessment rules 420 can include a scoring algorithm the web service security cockpit 410 can use to rate the degree to which a particular configuration attribute satisfies a corresponding security setting rule, as well as the threshold at which a particular configuration attribute is determined to be unsecure based on one or more security setting rules. Selection criteria 425 can define the criteria, instructions, and preferences for how the web service security cockpit 410 is to present unsecure configurations to the user, as well as what unsecure configurations should be presented. For example, the selection criteria 425 can permit that certain unsecure configurations identified by the web service security cockpit 410, can be ignored completely and filtered from the cockpit presented to the user.

Based on the assessment rules 420 and selection criteria 425, a listing of unsecure configurations can be generated for presentation to the user on GUI 415 of computing device 405. Indeed, listings of unsecure configurations of services to be served by the system (i.e., "endpoints") 430 can be generated, as well as listings of configurations of services to be consumed by the system (i.e., "logical ports") 435. Configuration objects corresponding to system endpoints and logical ports can be categorized or maintained accordingly, allowing users to easily distinguish and filter listings relating to either services consumer or served by the system.

With the unsecure configurations 430, 435 presented to the user, a user can initiate resolution of the unsecure configurations. In some examples, resolution of an identified unsecure web service configuration can include a request to ignore (e.g., 440) that a particular configuration attribute has been determined to be unsecure, failing to satisfy at least one security setting rule. Ignoring, or approving 440, an identified unsecure configuration can result in the generation of a record documenting that a particular IT personnel member approved an unsecure configuration. This can be useful in avoiding interdepartmental confusion and inconsistency in dealing with the unsecure configuration, as well as dealing with similar unsecure configurations in the future. For example, if another configuration attribute has been determined to be unsecure on similar bases as an earlier, accepted unsecure configuration, a user can be notified that the first unsecure configuration was approved and be provided with information to assist in determining whether the new unsecure configuration should also be ignored, such as metadata, user notes, identification of the approving IT personnel member, etc.

Alternatively, a user can reject 440 a particular, identified unsecure configuration and initiate further resolution and correction of the identified unsecure attribute. In some instances, approval of a particular unsecure configuration is an implicit admission that the configuration is known to be unsecure but that the unsecure configuration can be ignored. On the other hand, a rejection of an unsecure configuration can mean either i) that the user acknowledges or believes that the unsecure configuration is accurately determined to be unsecure, but that this security vulnerability should be addressed and corrected, or ii) that the user disputes the accuracy of the web service security cockpit's determination that the configuration does, in fact, represent a security vulnerability. Accordingly, based on the rejection 440 of an unsecure configuration, further actions can be triggered through the user interface 415 of the web service security cockpit. For example, a user can analyze and adjust assessment rules 445 to ensure that the web service security cockpit is able to accurately identify unsecure configurations. In other words, a user can double-check the accuracy of the assumptions, rules, and algorithms relied on by the web service security cockpit 410 in determining that the configuration was unsecure. In other examples, a user can redefine or refine security setting rules of the system's security policy to overcome a determination that a particular configuration is unsecure. A user can also create and assign tasks 448 directed to the resolution of an identified unsecure configuration. Indeed, in some examples, an individual or group responsible for a particular configuration can be identified from configuration data to automatically assign or recommend a particular task to the identified individual or group.

In addition to being able to analyze a determination that an unsecure configuration was accurate (e.g., by adjusting assessment rules 445) or creating a resolution task 448, a user can conduct additional security-related tasks through the user interface 415 of the web service security cockpit 410. For example, a user can set and define alerting rules 450 to create alerts for certain types and categories of unsecure configurations identified by the web service security cockpit 410. For example, a user can identify a particular, important security setting rule and request an alert any time the web service security cockpit 410 determines that a particular configuration attribute of a service violates the particular security setting rule. In another example, a user can identify a particular configuration attribute or parameter and set an alert to trigger if the web service security cockpit 410 determines that the particular configuration attribute or parameter violates a security setting rule defined in the security setting data consulted by the web service security cockpit 410. Further, a user can generate reports 460 and analytics presentations, based on the security analyses of the web service security cockpit 410 via the interface 415. Indeed, in some implementations, statistical results and analytics presentations can be generated automatically and presented to the user based on the presented listings of unsecure configurations presented to the user.

Figure 5:
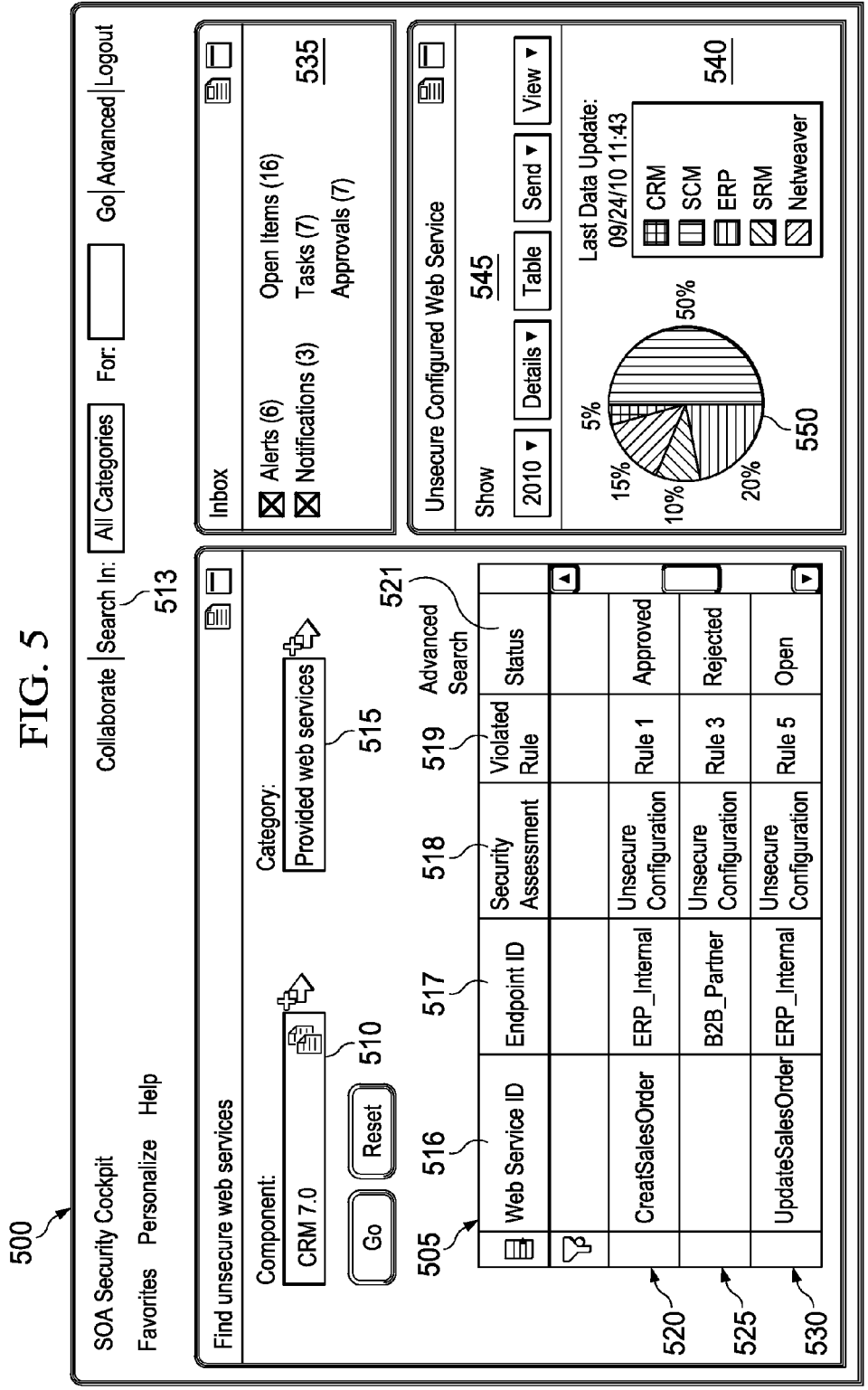
FIG. 5 is an example screenshots of a user interface of a web service security cockpit.

Turning now to FIG. 5, an example screenshot of a user interface 500 is shown of an example web service security cockpit display. A listing 505 of unsecure configurations is presented to a user. The listing 505 can include all unsecure configurations determined by the web service security cockpit for a system, or a subset of all of the unsecure configurations. For example, a user can specify, in field 510, that only unsecure configurations relating to a particular service or service package, in this case web service package "CRM 7.0," be presented. Further a user can filter the set of unsecure configurations not only by web service, but also by web services served or consumed by the system. For example, in field 515, a user can specify that only unsecure configurations for served web services be included in listing 505. Additionally, in some implementations, search functionality can be provided, for example using search tool 513, allowing a user to search configuration objects, security setting and rules data, identified unsecure configurations, security reports generated using the security cockpit, and tasks assigned using the cockpit, among other examples.

As shown in listing 505, multiple unsecure configurations 520, 525, 530 can be identified and aggregated in a single presentation 505 to assist a user in surveying the status of a system's web service configuration security. In some examples, as shown in FIG. 5, the listing 505 can include the identification of the web service 516, the particular configuration 517 for which an unsecure attribute was identified, a brief description of the security assessment 518, an identification of the security setting rule(s) violated 519, as well as the resolution status 521 of the identified unsecure configuration. In some examples, the security assessment 518 presented to the user can include a configuration security score calculated based on the results of the security assessment (e.g., security score of 0-100, where 100 is a perfectly secure configuration). Identifying the particular configuration 517 can be useful, particularly in examples involving web services served by the system, as a separate web service configuration can exist for each individual third party consumer of the web service (e.g., based on the agreed terms of service between the system providers and third-party consumer).

The resolution status 521 can indicate whether a user has already approved or rejected the identified unsecure configuration. "Open" resolution status can indicate that action still needs to be taken to either accept or reject the configuration and complete additional tasks to resolve the unsecure configuration. For instance, an inbox 535 can be provided showing, among other details and events, the alerts, notifications, open unsecure configurations awaiting user review, pending tasks assigned to the user or other individuals for resolving unsecure configurations, listings of approved unsecure configurations (e.g., for further review and confirmation), and other items. The inbox 535 can reflect a filtered set of unsecure configurations or system-wide unsecure configurations for review by the user. Selecting an item (e.g., "Alerts") in the inbox 535, can launch a more detailed view of the item, for example, by repopulating the listing window 505 with unsecure configuration listing consistent with the selected item (e.g., unsecure configurations triggering a particular alert). Additionally, selecting a particular unsecure configuration (e.g., 520, 525, 530) included in the listing 505 can result in additional or other windows being displayed corresponding to the selected configuration, including windows for use in generating and assigning resolution tasks to the user or other IT personnel relating to the selected unsecure configuration.

A listing 505 of unsecure configurations 520, 525, 530 can be supplemented by analytics and reporting displays (e.g., 540) providing the user with an additional or alternate representation of the system's web service security profile. Indeed, a user can generate custom graphs, reports, and summaries using reporting toolbar 545, based on the configuration data, security setting rules, and determined web service security assessments of the web service security cockpit. For example, a listing or analytics presentation 550 can be generated showing which web services, web service packages, or web service categories had the highest percentage of identified unsecure configurations in a given time period. Other analyses and analytics graphics can be generated reporting displays 540 of the web service security cockpit. For instance, the web service security cockpit can determine and present the ratio between secure and unsecure web service configurations for a particular web service, the most-violated security rules, the software components and services with the most unsecure configurations, the web services with the most-frequently approved unsecure configurations, and other examples. An aggregate security level can also be determined for a particular web service, taking into consideration the number of unsecure configurations and configuration attributes identified by the web service security cockpit, as well as the number of unsecure configurations "accepted" by the user and allowed to remain unresolved for the web service. Accordingly, the aggregate security levels of various web services consumed or served by a system can be further compared and analyzed, and reports generated. Additionally, users can further save, print, publish, or post analytics, analyses, and reports generated using the web service security cockpit for use and viewing by others.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

What is claimed is:

1. A computer-implemented method comprising:
identifying, in memory, a first configuration object in a plurality of configuration objects, each configuration object in the plurality of configuration objects identifying security settings for a web service being designed to be provided by an enterprise software environment, wherein the first configuration object identifies security settings for a first web service;
identifying, in memory, security setting data for the particular computing system defining a plurality of security setting rules for remote web services by the particular computing system in the enterprise software environment;
prior to deployment of the first web service, determining, using at least one processor, that a first security setting in the security settings for the first web service fails to satisfy at least one security setting rule in the plurality of security setting rules;
identifying, in memory, a second configuration object in the plurality of configuration objects, the second configuration object identifying security settings for a second web service to be being designed to be provided by the enterprise software environment;
prior to deployment of the second web service, determining, using at least one processor, that a second security setting in the security settings for the second web service fails to satisfy at least one security setting rule in the plurality of security setting rules;
generating a security report based at least in part on the determinations that the first and second security settings fail to satisfy at least one security setting rule in the plurality of security setting rules;
determining an aggregate security level for at least the first web service based at least in part on satisfaction of the plurality of security setting rules by the configuration for accessing the first web service and a number of unsecure configurations accepted and allowed to remain unresolved for the first web service, wherein the security report identifies the aggregate security level;
presenting, on a user interface of a computing device in the enterprise software environment, a service security cockpit identifying that configurations of at least the first and second web services are unsecure based at least in part on the determination that the first and second security settings fail to satisfy security setting rules;
receiving user input, entered using the service security cockpit, identifying a resolution action directed to resolve the first attribute failing to satisfy at least one security setting rule; and
initiating the identified resolution action.

2. The method of claim 1, wherein presentation of the service security cockpit includes:
identification of the first web service together with identification of the security setting rule the first security setting fails to satisfy; and
identification of the second web service together with the identification of the security setting rule the second security setting fails to satisfy.

3. The method of claim 2, wherein presentation of the service security cockpit further includes, for each identified failure of a web service to satisfy a security setting rule, resolution status of the identified failure.

4. The method of claim 2, wherein presentation of the service security cockpit further includes an identifier of the configuration for the first web service, wherein the configuration is one of a plurality of configurations of the first web service.

5. The method of claim 1, wherein the first and second web services are service oriented architecture (SOA) services.

6. The method of claim 1, wherein the first security setting for the first web service includes at least one of a network level security attribute, transport level security attribute, or a message level security attribute.

7. The method of claim 1, further comprising:
- determining, using at least one processor, that a third security setting for a particular web service fails to satisfy at least one security setting rule in the plurality of security setting rules;
- identifying selection criteria for the service security cockpit, the selection criteria defining at least one criteria for including an identification of a failure to satisfy the security rules in the presentation of the service security cockpit;
- determining, using at least one processor, that the failure of the first and second security settings to satisfy the security rules satisfies the selection criteria; and
- determining, using at least one processor, that the failure of the third security setting to satisfy the security rules does not satisfy the selection criteria, wherein the failure of the third security setting to satisfy the security rules is not included in the presentation of service security cockpit based on the selection criteria.

8. The method of claim 1, wherein the resolution action includes user authorization to ignore the failure of the first security setting to satisfy the at least one security setting rule.

9. The method of claim 1, wherein the resolution action includes assigning resolution of the failure of the first security setting to satisfy the at least one security setting rule to at least one IT personnel member.

10. The method of claim 9, wherein assigning resolution of the failure to at least one IT personnel member includes identifying, from the first configuration object, an association between the at least one IT personnel member and the first security setting of the configuration for accessing the first web service.

11. The method of claim 1, wherein determining that the first security setting for the first web service fails to satisfy at least one security setting rule triggers an alert presented in the service security cockpit based on at least one alert rule.

12. The method of claim 11, wherein the alert is triggered after determining that the first security setting for the first web service fails to satisfy at least one security setting rule.

13. The method of claim 1, further comprising:
- identifying, in memory, a third configuration object in the plurality of configuration objects, the third configuration object identifying security settings for a third web service served to at least one remote computing system by the particular computing system; and
- determining, using at least one processor, that a third security setting in the security settings for the third web service fails to satisfy at least one security setting rule in the plurality of security setting rules;
- wherein the service security cockpit further identifies that server-side configuration for accessing the third web service is unsecure.

14. The method of claim 1, wherein the security report identifies a listing of most-violated security setting rules among the plurality of security setting rules over a particular period of time.

15. An article comprising a non-transitory, machine-readable storage device storing instructions operable to cause at least one processor to perform operations comprising:
- identifying, in memory, a first configuration object in a plurality of configuration objects, each configuration object in the plurality of configuration objects identifying security settings for a web service being designed to be provided by an enterprise software environment, wherein the first configuration object identifies security settings for a first web service;
- identifying, in memory, security setting data for the particular computing system defining a plurality of security setting rules for remote web services by the particular computing system in the enterprise software environment;
- prior to deployment of the first web service, determining, using at least one processor, that a first security setting in the security settings for the first web service fails to satisfy at least one security setting rule in the plurality of security setting rules;
- identifying, in memory, a second configuration object in the plurality of configuration objects, the second configuration object identifying security settings for a second web service to be being designed to be provided by the enterprise software environment;
- prior to deployment of the second web service, determining, using at least one processor, that a second security setting in the security settings for the second web service fails to satisfy at least one security setting rule in the plurality of security setting rules;
- generating a security report based at least in part on the determinations that the first and second security settings fail to satisfy at least one security setting rule in the plurality of security setting rules;
- determining an aggregate security level for at least the first web service based at least in part on satisfaction of the plurality of security setting rules by the configuration for accessing the first web service and a number of unsecure configurations accepted and allowed to remain unresolved for the first web service, wherein the security report identifies the aggregate security level;
- presenting, on a user interface of a computing device in the enterprise software environment, a service security cockpit identifying that configurations of at least the first and second web services are unsecure based at least in part on the determination that the first and second security settings fail to satisfy security setting rules;
- receiving user input, entered using the service security cockpit, identifying a resolution action directed to resolve the first attribute failing to satisfy at least one security setting rule; and
- initiating the identified resolution action.

16. A system comprising:
- a data repository including at least one machine-readable storage device, maintaining:
  - a plurality of configuration objects, each configuration object in the plurality of configuration objects identifying security settings for a particular web service using a particular computing system in an enterprise software environment, and each web service is remote from the enterprise software environment; and
  - security settings data defining a plurality of security setting rules for remote web services using the particular computing system;
- a web service security cockpit operable to interact with the data repository and perform operations comprising:
  - identifying a first configuration object in a plurality of configuration objects defining security settings for a first web service being designed to be provided by the enterprise software environment;
  - prior to deployment of the first web service, determining that a first security setting in the security setting for the first web service fails to satisfy at least one security setting rule in the plurality of security setting rules;
  - identifying a second configuration object in the plurality of configuration objects, the second configuration object identifying security settings for a second web service being designed to be provided by the enterprise software environment;

prior to deployment of the first web service, determining that a second security setting for the second web service fails to satisfy at least one security setting rule in the plurality of security setting rules;

generating a security report based at least in part on the determinations that the first and second security settings fail to satisfy at least one security setting rule in the plurality of security setting rules;

determining an aggregate security level for at least the first web service based at least in part on satisfaction of the plurality of security setting rules by the configuration for accessing the first web service and a number of unsecure configurations accepted and allowed to remain unresolved for the first web service, wherein the security report identifies the aggregate security level;

presenting, on a user interface of a computing device in the enterprise software environment, a service security cockpit identifying that configurations of at least the first and second web services are unsecure based at least in part on the determination that the first and second security settings fail to satisfy security setting rules;

receiving user input, entered using the service security cockpit, identifying a resolution action directed to resolve the first attribute failing to satisfy at least one security setting rule; and initiating the identified resolution action.

17. The system of claim 16 further comprising at least one computing device adapted to consume the first and second web services from at least one remote computing device.

18. The system of claim 16 further comprising:
at least one computing device adapted to consume the first web service from a remote computing device; and
at least one computing device adapted to serve the second web service to a remote computing device.

\* \* \* \* \*